United States Patent
Kasztenny et al.

(10) Patent No.: US 9,478,378 B2
(45) Date of Patent: Oct. 25, 2016

(54) PREVENTING OUT-OF-SYNCHRONISM RECLOSING BETWEEN POWER SYSTEMS

(71) Applicant: Schweitzer Engineering Laboratories, Inc., Pullman, WA (US)

(72) Inventors: Bogdan Z Kasztenny, Markham (CA); Dale S Finney, Sydney Mines (CA)

(73) Assignee: SCHWEITZER ENGINEERING LABORATORIES, INC., Pullman, WA (US)

(*) Notice: Subject to any disclaimer, the term of this patent is extended or adjusted under 35 U.S.C. 154(b) by 561 days.

(21) Appl. No.: 13/734,041

(22) Filed: Jan. 4, 2013

(65) Prior Publication Data
US 2014/0191591 A1    Jul. 10, 2014

(51) Int. Cl.
| | |
|---|---|
| H02J 3/00 | (2006.01) |
| H01H 47/00 | (2006.01) |
| H02J 3/40 | (2006.01) |
| H02J 3/42 | (2006.01) |
| H02J 3/44 | (2006.01) |
| H01H 71/00 | (2006.01) |

(52) U.S. Cl.
CPC ........... *H01H 47/00* (2013.01); *H02J 3/40* (2013.01); *H02J 3/42* (2013.01); *H02J 3/44* (2013.01); *H01H 2071/006* (2013.01); *Y10T 307/951* (2015.04)

(58) Field of Classification Search
CPC ..................................... H02J 3/40; H02J 3/42
USPC ................... 307/112, 116, 125, 129
See application file for complete search history.

(56) References Cited

U.S. PATENT DOCUMENTS

| | | | |
|---|---|---|---|
| 4,249,088 A * | 2/1981 | Kleba et al. | 307/87 |
| 4,492,874 A * | 1/1985 | Near | 290/40 B |
| 4,636,909 A | 1/1987 | Brandt | |
| 4,672,501 A | 6/1987 | Bilac | |
| 4,715,000 A | 12/1987 | Premerlani | |

(Continued)

FOREIGN PATENT DOCUMENTS

| | | |
|---|---|---|
| CN | 101866787 | 10/2010 |
| WO | 2011150975 | 12/2011 |

(Continued)

OTHER PUBLICATIONS

Doug Salmon, Mark Zeller, Armando Guzman, Venkat Mynam, Marcos Donolo, Mitigating the Aurora Vulnerability With Existing Technology, Sep. 2009.

(Continued)

*Primary Examiner* — Adi Amrany
(74) *Attorney, Agent, or Firm* — Jared L. Cherry; Richard M. Edge (57) ABSTRACT

The present disclosure provides apparatus, systems, and methods for preventing out-of-synchronism closing between power systems. An intelligent electronic device (IED) apparatus may include a control component and a delay component. The control component is configured to selectively control opening and closing of a breaker. The control component selectively outputs a close signal to cause the breaker to connect a first portion of a power delivery system to another portion of the power delivery system. The delay component is configured to delay output of the close signal to the breaker. The delay component includes circuitry independent from control by the control component and the delay component is inconfigurable from a remote location.

23 Claims, 4 Drawing Sheets

(56) References Cited

U.S. PATENT DOCUMENTS

| | | | |
|---|---|---|---|
| 4,829,298 A | 5/1989 | Fernandes | |
| 5,006,846 A | 4/1991 | Granville | |
| 5,224,011 A | 6/1993 | Yalla | |
| 5,398,029 A | 3/1995 | Toyama | |
| 5,446,682 A | 8/1995 | Janke | |
| 5,473,204 A * | 12/1995 | Temple | H01H 43/028 307/141 |
| 5,498,956 A | 3/1996 | Kinney | |
| 5,534,782 A | 7/1996 | Nourse | |
| 5,592,393 A | 1/1997 | Yalla | |
| 5,721,689 A | 2/1998 | Hart | |
| 5,805,395 A | 9/1998 | Hu | |
| 5,809,045 A | 9/1998 | Adamiak | |
| 5,825,164 A * | 10/1998 | Williams | H02P 13/06 323/239 |
| 5,995,911 A | 11/1999 | Hart | |
| 6,121,886 A | 9/2000 | Andersen | |
| 6,141,196 A | 10/2000 | Premerlani | |
| 6,148,267 A | 11/2000 | Premerlani | |
| 6,236,949 B1 | 5/2001 | Hart | |
| 6,311,307 B1 | 10/2001 | Adamiak | |
| 6,313,614 B1 | 11/2001 | Persson | |
| 6,324,039 B1 | 11/2001 | Gross | |
| 6,366,864 B1 | 4/2002 | Kulidjian | |
| 6,426,856 B1 | 7/2002 | Schneerson | |
| 6,446,682 B1 | 9/2002 | Viken | |
| 6,456,056 B1 | 9/2002 | Katoh | |
| 6,456,947 B1 | 9/2002 | Adamiak | |
| 6,571,182 B2 | 5/2003 | Adamiak | |
| 6,603,298 B2 | 8/2003 | Guzman-Casillas | |
| 6,662,124 B2 | 12/2003 | Schweitzer, III | |
| 6,717,394 B2 | 4/2004 | Elms | |
| 6,735,063 B1 | 5/2004 | Bauer | |
| 6,738,269 B2 | 5/2004 | Nomiya | |
| 6,801,442 B2 | 10/2004 | Suzui | |
| 6,815,932 B2 | 11/2004 | Wall | |
| 6,845,333 B2 | 1/2005 | Anderson | |
| 6,934,654 B2 | 8/2005 | Benmouyal | |
| 7,230,809 B2 | 6/2007 | Whitehead | |
| 7,304,403 B2 | 12/2007 | Xu | |
| 7,328,114 B2 | 2/2008 | Premerlani | |
| 7,377,184 B1 * | 5/2008 | Schlachter | G01D 1/18 340/870.01 |
| 7,432,618 B2 | 10/2008 | Taylor | |
| 7,453,674 B2 | 11/2008 | Kuehnle | |
| 7,930,117 B2 | 4/2011 | Guzman-Casillas | |
| 2001/0012984 A1 | 8/2001 | Adamiak | |
| 2001/0023703 A1 * | 9/2001 | Kondo | H01L 31/02021 136/244 |
| 2002/0101229 A1 | 8/2002 | Roberts | |
| 2003/0217293 A1 | 11/2003 | Lee | |
| 2004/0186669 A1 | 9/2004 | Benmouyal | |
| 2005/0281066 A1 * | 12/2005 | Wheeler | H02M 5/293 363/131 |
| 2006/0069522 A1 | 3/2006 | Bruno | |
| 2006/0247874 A1 | 11/2006 | Premerlani | |
| 2007/0008033 A1 | 1/2007 | Okazaki | |
| 2007/0086134 A1 | 4/2007 | Zweigle | |
| 2007/0136013 A1 | 6/2007 | Premerlani | |
| 2008/0122293 A1 | 5/2008 | Ohm | |
| 2008/0218003 A1 * | 9/2008 | Von Seidel | H02J 3/14 307/141 |
| 2008/0294353 A1 * | 11/2008 | Poeltl et al. | 702/33 |
| 2009/0108678 A1 * | 4/2009 | Algrain | 307/87 |
| 2009/0115509 A1 | 5/2009 | Minteer | |
| 2010/0132916 A1 * | 6/2010 | Stauffer | G05D 23/1909 165/41 |
| 2010/0161263 A1 | 6/2010 | Benmouyal | |
| 2010/0296221 A1 | 11/2010 | Shah | |
| 2011/0241356 A1 * | 10/2011 | Khoshnevis | 290/1 R |
| 2012/0181342 A1 * | 7/2012 | Richards-Fabian | F24F 11/006 236/46 A |
| 2012/0316069 A1 * | 12/2012 | Murphy et al. | 505/150 |
| 2013/0052872 A1 * | 2/2013 | Magee, Jr. | H01R 25/003 439/620.21 |
| 2013/0133262 A1 * | 5/2013 | Marchetto | H04L 12/282 49/24 |
| 2013/0208381 A1 * | 8/2013 | Burkart | 361/71 |
| 2013/0215556 A1 * | 8/2013 | Bjorklund | 361/622 |
| 2013/0221760 A1 * | 8/2013 | Mori et al. | 307/130 |
| 2014/0002944 A1 * | 1/2014 | Menezes et al. | 361/160 |
| 2014/0029152 A1 * | 1/2014 | Mazzola et al. | 361/115 |

FOREIGN PATENT DOCUMENTS

| | | |
|---|---|---|
| WO | 2012042364 | 4/2012 |
| WO | 2012116748 | 9/2012 |
| WO | 2012136274 | 10/2012 |

OTHER PUBLICATIONS

PCT/US2013/078093 Patent Cooperation Treaty, International Search Report and Written Opinion of the International Searching Authority, Dec. 27, 2013.

Edmund O. Schweitzer, III, David Whitehead, Armando Guzman, Yanfeng Gong, Marcos Donolo, Advanced Real-Time Synchrophasor Applications, Oct. 2008.

Cooper Power Systems, Product Brief, iGR-933 Rotating Equipment Isolating Device, Nov. 2007.

Cooper Power Systems, Protective Relays, iGR-933 Rotating Equipment Isolating Device (web page) <http://www.cooperpower.com/products/protective/idea/reid.asp> visited on Sep. 3, 2009.

John Mulhausen, Joe Schaefer, Mangapathirao Mynam, Armando Guzman, Marcos Donolo, Anti-Islanding Today, Successful Islanding in the Future, Sep. 18, 2009.

Venkat Mynam, Armando Guzman, Islanding Detection and Adaptive Load Shedding, Sep. 30, 2009.

Armando Guzman, Venkat Mynam, Islanding Detection for Distributed Generation, Aug. 27, 2009.

Tyco Electronics UK Limited, Crompton Instruments, Installation and Operating Instructions R.O.C.O.F. Protection Relay, Nov. 2008.

E. Roy Hamilton, John Undrill, Paul S. Hamer, Scott Manson, Considerations for Generation in an Islanded Operation, Apr. 16, 2009.

Musaab M. Almulla, Mohammed Akhil Fazil, Nicholas Seeley, Energy Management Systems for Islanded Industrial Facilities, Jan. 23, 2009.

Boungwook Cho, Heechul Kim, Musaab M. Almulla, Nicholas C. Seeley, The Application of a Redundant Load-Shedding System for Islanded Power Plants, Oct. 20, 2008.

Gabriel Benmouyal, Angelo D'Aversa, Concurrent Implementation of 81 Frequency Elements Together with Frequency Tracking in Protective Relays: Issues and Solutions, Sep. 18, 2009.

Daqing Hou, Relay Element Performance During Power System Frequency Excursions, Aug. 24, 2007.

A. G. Phadke, J. S. Thorp, M. G. Adamiak, A New Measurement Technique for Tracking Voltage Phasors, Local System Frequency, and Rate of Change of Frequency, IEEE Transactions on Power Apparatus and Systems, vol. PAS-102, No. 5, May 1983.

P J Moore, J H Allmeling, A T Johns, Frequency Relaying Based on Instantenous Frequency Measurement, IEEE 96 WM 066-1 PWRD, Oct. 1996.

Doug Salmon, Mark Zeller, Armando Guzman, Venkat Mynam, Marcos Donolo, Mitigating the Aurora Vulnerability With Existing Technology, 2009.

* cited by examiner

PREVENTING OUT-OF-SYNCHRONISM RECLOSING BETWEEN POWER SYSTEMS

TECHNICAL FIELD

This disclosure relates to connecting power delivery systems and more particularly relates to preventing out-of-synchronism closing of a breaker that connects a generator and an electric power delivery system.

BRIEF DESCRIPTION OF THE DRAWINGS

Non-limiting and non-exhaustive embodiments of the disclosure are described herein, including various embodiments of the disclosure illustrated in the figures listed below.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Connecting a synchronous generator to a power system such as another generator or a power delivery grid requires careful matching of the generator frequency and generator voltage with that of the power system. In other words, the phase angle and difference in voltage between the generator and power system should be near zero (ideally exactly zero) at the time of closing of a breaker to connect the generator to the power system. A failure to do so imposes torsional stress on the generator and its prime mover. This failure to properly synchronize prior to closing is known as out-of-synchronism closing. The torsional stress resulting from out-of-synchronism closing can be several times the design rating of the machine, depending on the difference in voltage, frequency, and phase angle at the instant of out-of-synchronism closing. The resulting damage to the machine is also generally cumulative. For example, a machine may remain in operation after an initial out-of-synchronism closing event but may fail after several subsequent out-of-synchronism closing events. It should be noted that, as used herein, "close" and "closing" can include "reclose" and "reclosing" unless otherwise indicated.

Generally there are two methods for properly synchronizing a generator to the power system; manual synchronization and auto-synchronization. In manual synchronization a plant operator sends commands to the generator's automatic voltage regulator and governor to bring the voltage and frequency differences to within acceptable limits. The plant operator then monitors the phase angle between the generator and power system using a synchroscope (phase difference indicating meter). When the angle reaches zero the plant operator manually initiates a breaker close command using a push button, panel switch or through a human machine interface such as a keyboard, mouse, or touch screen. In auto-synchronization, an auto-synchronizer device monitors voltage and frequency and initiates substantially the same control actions as would a plant operator.

While proper implementation of the above methods usually results in synchronism between the generator and the system at the moment of closing, additional checks and protections are generally included in case of operator error or malicious close attempts. For example, hardware or external synchrochecks, relays, breaker anti-pumping circuits, islanding logic or other devices or methods may be used to prevent out-of-synchronism closing. These additional protection mechanisms help reduce the chance of out-of-synchronism closing even if an error or a purposeful attempt at out-of-synchronism closing is made.

However, recent studies have identified vulnerabilities that might allow an unauthorized individual to intentionally trigger an out-of-synchronism closing from a remote location despite the above protections. Specifically, a precisely timed opening and quick reclosing of a circuit breaker may not be prevented by included hardware protections such as the above mentioned auto-synchronizer, synchrochecks, breaker anti-pumping circuits, and/or islanding logic. While this quick reclosing may be prevented by an IED, an unauthorized individual who has penetrated the protection and control system may be able to reprogram the IED and thus exploit the above vulnerability. For example, the auto-synchronizer and/or synchrocheck relay are typically microprocessor controlled devices. Since they are programmable, there is a potential for an unauthorized individual to reconfigure or reprogram these devices in order to allow an out-of-synchronism close operation to occur. After reprogramming, one or more opening and reclose operations may be implemented to accomplish an out-of-synchronism closing.

This type of intentional out-of-synchronism closing is often referred to as an "aurora attack" or "aurora vulnerability". An aurora attack could be used to intentionally damage a generator, turbine shaft, or other rotating machine through multiple reclosing of a breaker connecting the machine (or a small island of machines) to the power system. Generally, an aurora attack is envisioned as a cyber attack in that penetration of communication network protection mechanisms and taking control remotely over a relay that operates the breaker may be possible. As such, physical access for sophisticated, coordinated, and potentially large attacks may not be needed. Aurora attacks could leave large regions without power for significant time periods and thus can present a domestic or national security hazard. Although aurora attacks may generally be prevented by ensuring network security and relying on the above checks, it can be difficult or impossible to ensure complete network security in absolute terms.

The present application discloses an apparatus, system and method for preventing out-of-synchronism reclose attempts. In one embodiment, an intelligent electronic device (IED) such as a microprocessor based relay includes a control component and a delay component. The control component may be configured to selectively control opening and closing of a breaker and selectively outputs a close signal to cause the breaker to connect a first portion of a power system to a second portion of the power system. In one embodiment, the delay component is configured to delay output of the close signal to the breaker. The delay component includes circuitry that is independent from control by the control component. The delay component may be inconfigurable from a remote location.

The delay provided by the delay component within the IED may provide for a robust and simple prevention of aurora attacks. The delay may cause any attempted aurora attacks to fail because reclose attempts are delayed long enough until other protection mechanisms are able to prevent out-of-synchronism closing. Additionally, the integrated delay component within an IED provides out-of-synchronism closing protection without requiring additional devices or having a negative impact on reliability. Rather the prevention mechanism is built into an IED or other device that is used for other purposes and thus does not increase complexity, wiring, or possible failure points.

As used herein, the term IED may refer to any microprocessor-based device that monitors, controls, automates, and/or protects monitored equipment within a system. Although the present disclosures provides embodiments of a generator IEDs, other embodiments may include any IED or device controlling operation of a breaker or synchronization between systems or devices. The equipment monitored by an IED may include conductors such as transmission lines, distribution lines, buses and the like, transformers, autotransformers, voltage regulators, tap changers, capacitor banks, static VAR compensators, reactors, static synchronous compensators, inverters, generators, generator islands, interties, circuit breakers, switches, motors, fuses, loads, and the like. The term IED may be used interchangeably to describe an individual IED or a system comprising multiple IEDs.

Aspects of certain embodiments described herein may be implemented as either software components or hardware components. As used herein, a software component may include any type of computer instruction or computer executable code located within or on a computer-readable storage medium or a non-transitory computer-readable storage medium, and may include firmware. A software component may, for instance, comprise one or more physical or logical blocks of computer instructions, which may be organized as a routine, program, object, component, data structure, etc., that performs one or more tasks or implements particular abstract data types.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array (FPGA), or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components. For example, in many instances a first component may be described herein as "connected" to a second component, when in fact the first component is connected to the second component via a third component, a section of wire, an electrical trace, another first component, another second component, and/or another electrical component.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

Figure 1:
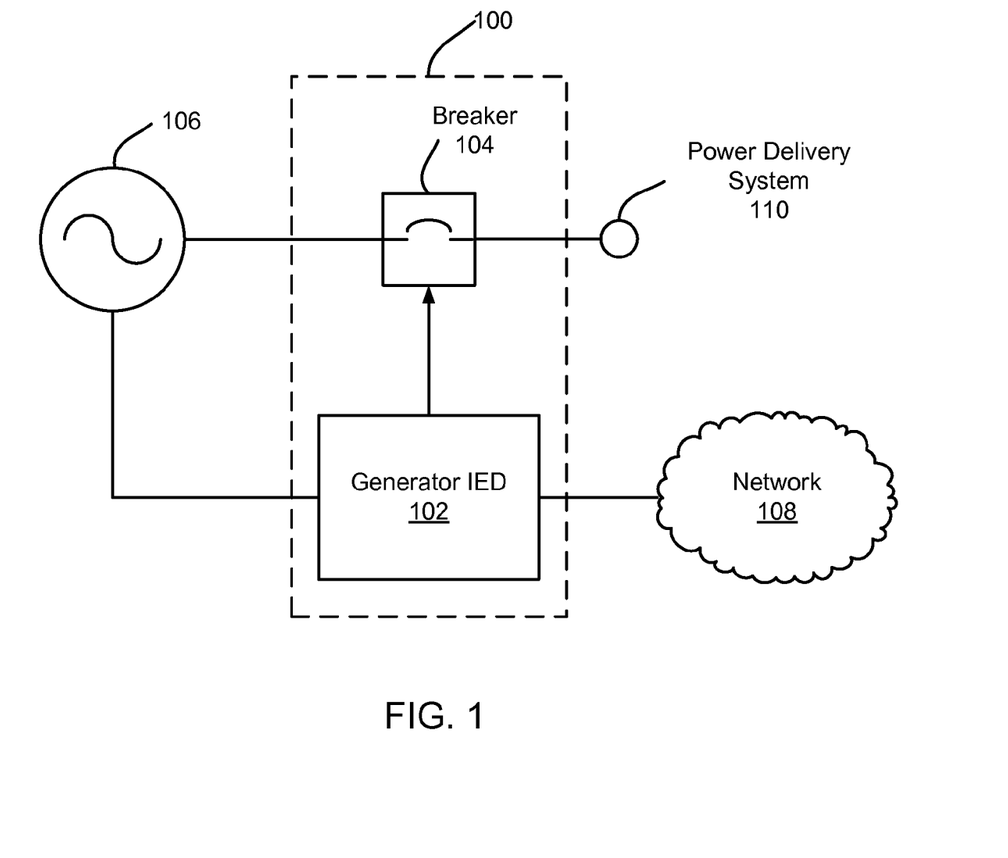
FIG. 1 is a schematic diagram illustrating one embodiment of a system for preventing out-of-synchronism closing between a generator and a power delivery system.

Turning now to the figures, FIG. 1 is a schematic diagram illustrating one embodiment of a control system 100 for selectively connecting or isolating a first portion of an electric power delivery system, which, as illustrated, comprises a generator 106 to or from a second portion of the power delivery system 110. The control system 100 includes generator IED 102 and breaker 104. Generator 106 may be either a synchronous generator or an induction generator such as a diesel generator, turbine generator, or other rotating electric generator. Power delivery system 110 may include electric power transmission systems, electric power distribution systems, or the like, along with associated equipment for delivery of electrical power. Power delivery system 110 may be energized by generator 106 and/or one or more additional generators.

Generator IED 102 is configured to control breaker 104. Breaker 104 is configured to selectively connect and isolate the generator 106 from the power delivery system 110. Generator IED 102 may also control operation of generator 106, such as the voltage and frequency of electrical power generated by generator 106. Generator IED 102 may be configured to communicate over a network 108 with another device. For example, generator IED 102 may be updated, programmed, and/or controlled remotely via network 108. Further description of generator IED 102 will be provided in relation to FIG. 2.

Although control system 100 is depicted as controlling connection between generator 106 and power delivery grid 110, other power delivery and/or consumption systems may also be included in place of the generator. For example, control system 100 may be used to connect a first generator to a second generator. Additionally, control system 100 may be used to connect an island of generators to a power delivery system or a subset of a power delivery grid to the rest of a power delivery grid.

Figure 2:
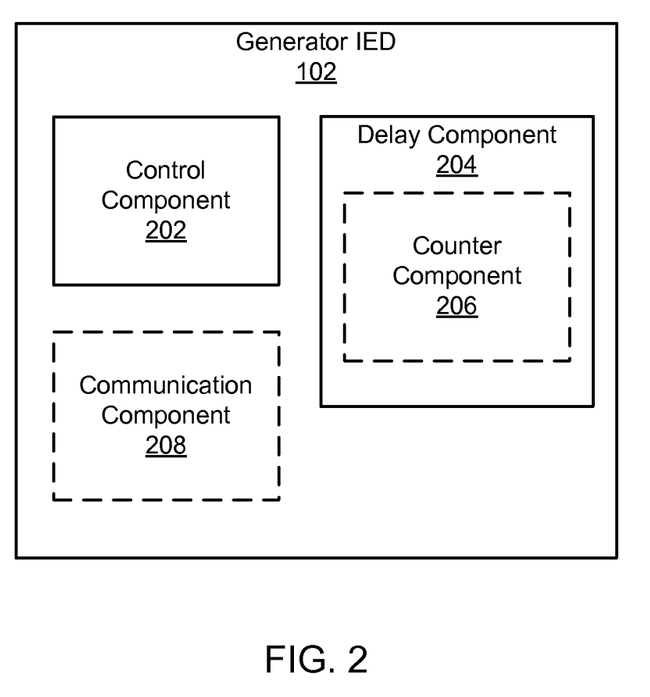
FIG. 2 is a schematic block diagram illustrating one embodiment of a generator IED for preventing out-of-synchronism closing.

FIG. 2 is a schematic block diagram illustrating one embodiment of generator IED 102. Generator IED 102 includes control component 202 and delay component 204. In some embodiments, generator IED 102 may include a counter component 206 and communication component 208. The generator IED 102 may be configured to control operation of breaker 104 and/or the generator 106 of FIG. 1.

Control component 202 may be configured to selectively control opening and closing of breaker 104. Control component 202 may control closing of breaker 104 by providing a close signal to cause breaker 104 to connect a generator to a power delivery system.

Control component 202 may include a processor and memory storing instructions executable by the processor. In one embodiment, control component 202 determines, using the processor, whether to output a close signal based on instructions stored in the memory. The instructions in memory may include one or more software components for implementing a variety of functions such as checking whether generator 106 is synchronized with a power delivery system 110, synchronizing a generator 106 with a power delivery system 110, determining that breaker 104 should be closed, and the like. In one embodiment, control component 202 may output a close signal based on one or more of frequency, voltage level, phase angle, operator input, or the like. Additionally, control component 202 may output a close signal in response to information received from another device over network 108.

In one embodiment, control component 202 may be programmed and/or reprogrammed to add or change functionality. For example, firmware of generator IED 102 may be updated to add functionality or fix bugs or errors. Such programmability may allow for significant improvements and functionality as errors are located or new functionality is created.

Delay component 204 is configured to delay output of the close signal to breaker 104. Delay component 204 may receive the close signal from control component 202 and delay output of the close signal to breaker 104. In one embodiment, delay component 204 delays the output of the close signal for a delay time. The delay time may be sufficient to allow protective mechanisms of generator IED 102, generator 106, or other protective mechanisms to sufficiently protect the generator 106 from out-of-synchronism reclosing. For example, one or more hardware or software components of generator 106, generator IED 102, or other device may provide insufficient protection for a short period after reclosing and the delay time may be sufficient to delay output of the close signal until the short time period of vulnerability has passed. In one embodiment, the delay time may be ten seconds or more, for example between one minute and ten minutes. In one embodiment, the delay time is adjustable between no delay and ten minutes.

In one embodiment, delay component 204 delays the output of the close signal for a delay time measured from receipt of the close signal from control component 202.

In another embodiment, delay component 204 delays output of the close signal for a delay time measured from an isolation of generator 106 from power delivery system 110. For example, the delay time may be measured from a time of isolation of the generator 106 from the power delivery system 110, such as when breaker 104 has opened. This may provide an amount of delay of the delay time or less between when the close signal is output by control component 202 and when the close signal is output to breaker 104. In other words, if the close signal is output at a time greater than the delay time following isolation of generator 106, delay component 204 may not delay the close signal at all. However, if the close signal is output by control component 202 very shortly after isolation, the close signal may be delayed for almost the full delay time.

In one embodiment, delay component 204 includes circuitry independent from control by control component 202. In one embodiment, the delay component 204 may include circuitry independent from control by control component 202 in that the circuitry is not controlled by a processor or other component of control component 202. For example, control component 202 may not be capable of controlling operation of delay component 204. Similarly, control component 202 may not be capable of configuring a delay time, disabling a delay, and/or enabling a delay provided by delay component 204. In one embodiment, delay component 204 may include a hardware based timer such as an analog time circuit that cannot be controlled or configured by control component 202. For example, the hardware based timer may be configurable only by physically altering a circuit of the hardware based timer or by physically altering connections or physical switches. In another embodiment, delay component 204 may include a software or digital timer but control component 202 may not be provided electrical connections to delay component 204 that allow control component 202 to configure or control delay component 204.

In one embodiment, a timer of delay component 204 is truly hardware based. For example, in one embodiment, the timer is not implemented in a field programmable gate array (FPGA) or any other re-programmable environment. Rather, the timer may be an analog timer circuit. In one embodiment, the timer is started upon the operation of a breaker open contact which may be triggered upon opening of breaker 104 by control component 202 or by an operator. For example, an operator may use the breaker open contact for isolating a generator 106 while using the time-supervised output for closing. Alternatively, the timer may be started upon the operation of a close contact that closes in response to receiving the close signal from the control component 202 or an operator. This embodiment may allow for one quick reclose but would prevent subsequent quick reclose attempts.

In one embodiment, delay component 204 is inconfigurable from a remote location. For example, delay component 204 may not be configurable using a device in communication with generator IED 102 over a network. Rather, delay component 204 may only be configurable in person by physically adjusting, altering, or otherwise configuring delay component 204.

In one embodiment, delay component 204 includes a hardware configuration component and delay component 204 is configurable on-site using the hardware configuration component. For example, the hardware configuration component may include a dual in-line package (DIP) switch, jumper terminals, and/or other physical components that require physical manipulation to alter a delay time, disable delay of the close signal, and/or enable delay of the close signal. For example, a DIP switch with multiple switches may be set to a no delay state by setting all switches to an off position and set to a maximum delay state by setting all switches to an on position. An intermediate delay may be set by setting some of the switches to an on position and some of the switches to an off position. In one embodiment, the hardware configuration component is the only way to enable, disable, or otherwise configure delay component 204. In another embodiment, a jumper may be placed across a jumper terminal to enable or disable the delay and thus allow either "regular" or "Aurora" type operation.

Delay component 204 that is not controllable by control component 202 and/or inconfigurable from a remote location may provide strong protection against an aurora attack. For example, if control component 202 cannot control delay component 204 a remote user cannot issue instructions to control component 202 to override or alter operation of delay component 204. Similarly, a remote user will not be able to reprogram or alter control component 202 to disable the delay provided by delay component 204 and any attempted reclosing will be delayed until other mechanisms are able to catch and prevent any out-of-synchronism closings. Thus, any individual attempting to cause an out-of-synchronism closing must gain physical access to generator IED 102 to attempt to initiate the out-of-synchronism closing. Because physical security may be easier to ensure than network security and/or because a single person cannot be located at multiple power generation sites at the same time, any attempted out-of-synchronism closing may be blocked or extremely limited in scope.

In one embodiment, the generator IED 102 may be configured to detect changes to the delay component, and issue an alarm when changes are made. For example, the processor of the control component 202 may be configured to read the position of the jumper or DIP switch before issuing a close command. If the position has changed from a previous position, then the processor may issue an alarm. In another embodiment, the processor may be configured to periodically read the position of the jumper or DIP switch, read the position according to a schedule, or upon occurrence of an event such as, for example, a receipt of an open command, receipt of a close command, detection of a fault, receipt of an alarm from another IED, or the like, and issue an alarm if the position has changed. In another embodiment, the IED may be configured to, upon detection of a change in position of a jumper or DIP switch, take an action such as, for example, issue an alarm, disable network access, disable front-panel access, require a password before accepting a command, enter a secure mode, disable manual closing, or the like.

Thus, delay component 204 implements a closing delay within generator IED 102 that can nevertheless not be circumvented due to the independence of delay component 204 from control component 202. If delay component 204 were not independent, an unauthorized user who gains control of generator IED 102 may also be able to configure or disable the delay provided by delay component 204. Thus, generator IED 102 of FIG. 2 provides "aurora" mitigation even if the entire relay has been remotely hijacked or reprogrammed.

In one embodiment, delay component 204 may include counter component 206. Counter component 206 may count a number of recloses attempts. In one embodiment, counter component 206 may allow a fixed number of reclose attempts in a specific time period before delaying output of a close signal to breaker 104. For example, delay component 204 may not provide any delay to a close signal until counter component 206 counts three reclose attempts within a one minute time period. Thus, inclusion of the counter circuit can be used to allow a fixed number of fast reclose operations, which may be desirable in certain settings, such as when connecting one portion of a power delivery grid to another portion of the power delivery grid. Any other fixed number of reclose attempts and specific time period may be used in other embodiments. Similar to delay component 204, counter component 206 may be independent from control by control component 202 and/or may be inconfigurable from a remote location.

Generator IED 102 may include a communication component 208 for communicating with other devices. In one embodiment, communication component 208 may allow generator IED 102 to communicate with another device either directly or over a communication network such as network 108. For example, an automation controller that controls operation of generator IED 102 and/or one or more additional IEDs or systems may be able to communicate with generator IED 102 via the communication component 208. Control commands, updates, or other commands or signals may be sent to generator IED 102 by the automation controller or another device. In one embodiment, control component 202 may be able to send instructions or other information to another device through communication component 208.

Generator IED 102 with integrated delay component 204 prevents rapid opening and closing of generator breaker 104 which allows other mitigation methods and devices to operate to prevent out-of-synchronism closing. The delay provides considerable protection against aurora attacks. Because the aurora attacks take advantages of vulnerabilities of other protection mechanisms within a short time period of opening, the delay for reclosing may render quick reclosing, and thus aurora attacks, impossible. Because the delay is not configurable through reprogramming or remote instructions, the delay cannot be remotely disabled and thus physical access may be necessary in order to carry out any out-of-synchronism attack on a generator or other power system. The delay provided by delay component 204 generally does not reduce performance because generators are not normally required to quickly reconnect to the power system following disconnection. In a worst case event where a generator is inadvertently disconnected, the shortest time for a normal reconnection will often be on the order of several minutes. However, even if quick reclose is sometimes needed, such as when reconnecting a portion of the power delivery grid to another portion of the power delivery grid, counter component 206 can allow a fixed number of reclose attempts before providing the delay. This may provide protection while still allowing optimal quick reclose capability if needed.

One exemplary embodiment where some quick reclose capability may be needed is where one or more breakers connect a portion of a power delivery system that does not include rotating machinery to the rest of the power delivery system. For example, two or more breakers may be capable of isolating the portion of the power delivery system not including rotating machinery and, if isolated and reclosed, may cause an out of synchronism closing between the portion of the power delivery system and the rest of the power delivery system. This may cause a fault on the line and could damage rotating equipment, such as generators or electric motors, connected to the power delivery system at other locations outside of the portion of the power delivery system that does not include rotating machinery. While it may be desirable to quickly reconnect different portions of the power delivery system, it may also be desirable to limit multiple openings and reclosings of a breaker. In this case, the counter component 206 on one or more of the breakers allows a fixed number of reclose attempts before delaying any reclose attempt.

Figure 3:
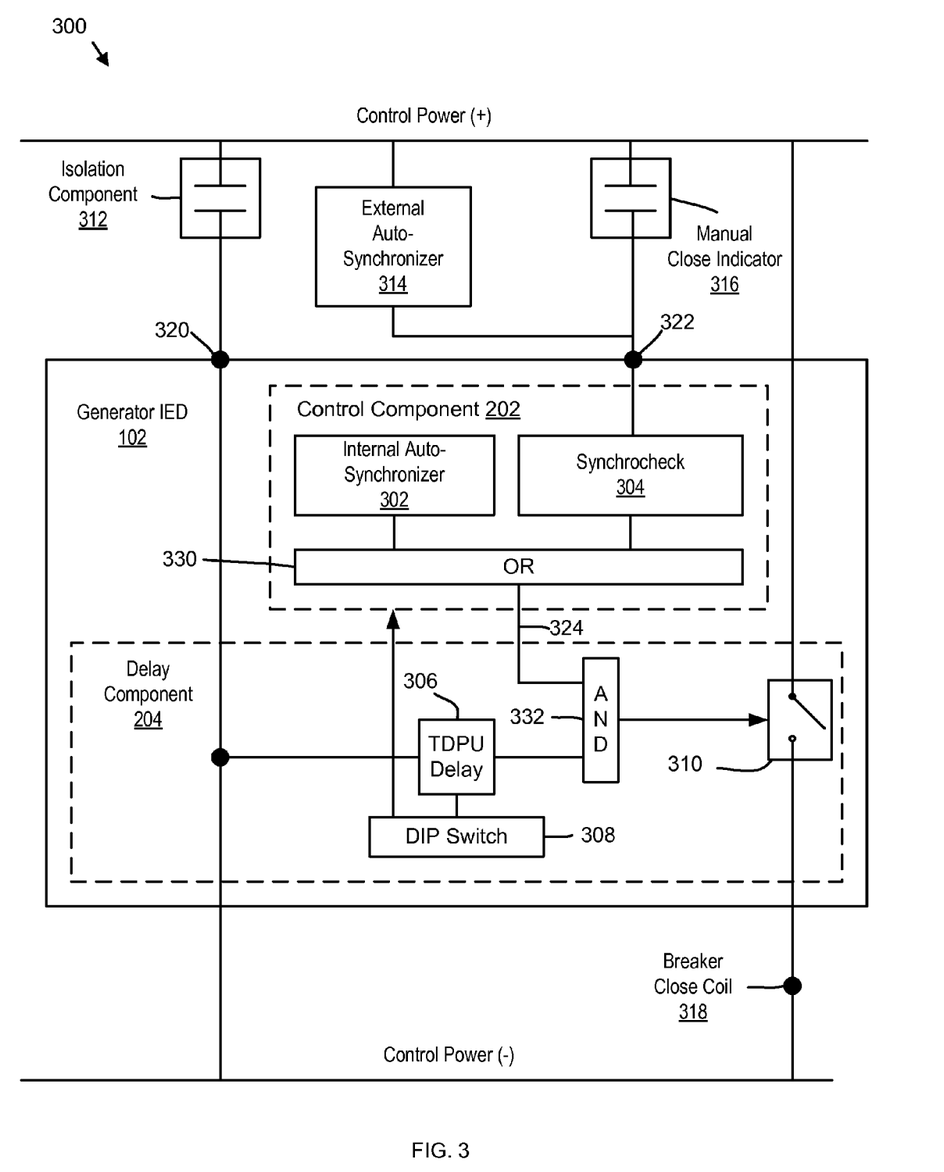
FIG. 3 is a schematic connection diagram illustrating one embodiment of external and internal logical interconnection of a generator IED.

FIG. 3 is an exemplary schematic diagram 300 illustrating exemplary internal and external logical connection of a generator IED 102. Generator IED 102 is shown including a control component 202 and a delay component 204. Control component 202 includes an internal auto-synchronizer 302 and a synchrocheck 304. Delay component 204 includes a time delay on pickup (TPDU) delay 306, a DIP switch 308, and a breaker close output switch 310. The diagram 300 also illustrates external components including an isolation component 312, an external auto-synchronizer 314, a manual close indicator 316, and a breaker close coil 318.

Isolation component 312 is connected to a first input 320 of generator IED 102. Isolation component 312 may detect that a generator has been isolated from a power delivery system and provide a signal to generator IED 102 indicating isolation. In one embodiment, isolation component 312 detects isolation of the generator or other power delivery system by detecting opening of a breaker. Isolation component 312 may be included within generator IED 102 in one embodiment.

External auto-synchronizer 314 and manual close indicator 316 are connected to second input 322 of generator IED 102. External auto-synchronizer 314 may be configured to adjust one or more of the voltage, frequency, and phase angle of generator 106 with respect to power delivery system 110 to synchronize generator 106 and power delivery system 110. External auto-synchronizer 314 may output a signal indicating that generator 106 is synchronized with power delivery system 110. Manual close indicator 316 may indicate that an operator has attempted to initiate close of breaker 104 using a switch or other human machine interface.

Second input 322, connected to external auto-synchronizer 314 and manual close indicator 316, is provided to synchrocheck 304 of control component 202. Synchrocheck 304 may determine whether generator 106 is synchronized with a corresponding power delivery system 110. Synchrocheck 304 may receive input from a variety of different sensors and/or devices to determine whether generator 106 is synchronized. If synchrocheck 304 determines that generator 106 and power delivery system 110 are sufficiently synchronized and/or receives a signal from external auto-synchronizer 314 or manual close indicator 316 to close breaker 104, synchrocheck 304 outputs a true signal.

Internal auto-synchronizer 302 of control component 202, similar to external auto-synchronizer 314, may be configured to adjust one or more of the voltage, frequency, and phase angle of generator 106 with respect to power delivery system 110 to synchronize generator 106 with respect to power delivery system 110. Internal auto-synchronizer 302 may output a true signal indicating that generator 106 is synchronized.

The output of internal auto-synchronizer 302 and synchrocheck 304 are combined through OR function 330 to create an output on a close signal line 324. Close signal line 324 is configured to provide a close signal to delay component 204 when the input of both internal auto-synchronizer 302 and synchrocheck 304 are true. In one embodiment, the close signal comprises a "true" signal as output from the OR function.

First input 320 is connected to TDPU delay 306. Upon receiving the indication of isolation of generator 106, TDPU delay 306 starts a timer. For example, when the input to TDPU delay 306 is asserted a hardware-based timer is initiated and the output of TDPU delay 306 is set to false until a delay time has passed.

A delay time of TDPU delay 306 is controlled by DIP switch 308. DIP switch 308 may include one or more switches which can be manipulated to set TDPU delay 306 to two or more states. For example, the states may include an off state, an on state, and/or one or more delay time states. In one embodiment, the time delay is adjustable between 1 and 10 minutes or the delay may be completely disabled. In one embodiment, DIP switch 308 can only be physically accessed by removing hardware from the chassis of generator IED 102. DIP switch 308 also provides an output to control component 202 so that the current state of delay component 204 may be read by control component 202 or a remote device.

When the output of TDPU delay 306 and the OR function of control component 202 are both true, an AND function of delay component 204 triggers operation of breaker close output switch 310. Breaker close output switch 310 is connected to breaker close coil 318 which closes breaker 104 in response to delay component 204 closing breaker close output switch 310.

As discussed previously control component 202 may be implemented in firmware or other instructions which may be executable by a processor. As such, internal auto-synchronizer 302, synchrocheck 304, and/or OR function 330 may be implemented as code stored in memory. Similarly, delay component 204 may be implemented independent from control component 202 and may be inconfigurable by control component 202. In one embodiment, TDPU delay 306, AND function 332, DIP switch 308, and/or breaker close output switch 310 may be implemented in non-programmable hardware. Because delay component 204 is implemented independent from control of control component 202, such as in hardware, generator IED 102 prevents "Aurora" attacks even if an individual is able to gain full control over generator IED 102 and reprogram settings and/or firmware. As such, generator IED 102 prevents undesired closure of a breaker under any remote cyber-attack scenario up to and including loading and running an altered firmware image.

Figure 4:
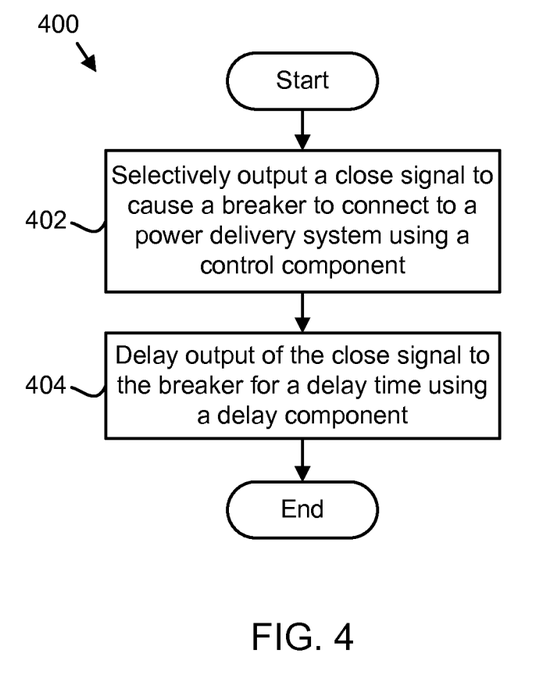
FIG. 4 is a schematic flow chart diagram illustrating one embodiment of a method for preventing out-of-synchronism closing.

FIG. 4 is a schematic flow chart diagram illustrating a method 400 for preventing out-of-synchronism closing. Method 400 may be used by an IED that connects one power system to another power system. In one embodiment, method 400 may be used to prevent out-of-synchronism closing between a generator and a power delivery system. In another embodiment, method 400 may be used in multiple IEDs to prevent out-of-synchronism closing between a first portion of a power delivery system and a second portion of the power delivery system.

Method 400 includes selectively outputting 402 a close signal to cause a breaker to connect a portion of a power delivery system (such as, for example, a generator) to another portion of the power delivery system. In one embodiment, the close signal is output 402 by a control component of a generator IED. The control component may be configured to selectively control opening and closing of the breaker. The breaker may be electrically situated between the first portion of a power delivery system and another portion of the power delivery system.

Method 400 includes delaying 404 output of the close signal to a breaker using a delay component. The delay component may be a delay component of a generator IED. The delay component may include circuitry independent from control by the control component and the delay component may be inconfigurable from a remote location. In one embodiment, the method 400 also includes counting a number of reclose attempts using a counter component before delaying 404 output of the close signal by the delay component.

The above description provides numerous specific details for a thorough understanding of the embodiments described herein. However, those of skill in the art will recognize that one or more of the specific details may be omitted, modified, and/or replaced by a similar process or system.

What is claimed:
1. An intelligent electronic device (IED), comprising:
 a control component configured to selectively control opening and closing of a breaker, wherein the control component selectively outputs a close signal to cause the breaker to connect a first portion of a power delivery system to another portion of the power delivery system, the control component comprising:
 a synchronization component in communication with the power delivery system, the synchronization component configured to determine whether the first portion of the power delivery system is synchronized with the another portion of the power delivery system and output a synchronization signal when the first portion of the power delivery system is synchronized with the another portion of the power delivery system; and,
 a delay component in communication with the control component, configured to delay for a delay time, an output of the close signal to the breaker until both the synchronization signal is received from the synchronization component and the delay time ends, wherein the delay component comprises circuitry independent from control by the control component and wherein the delay component is only configurable by physical alteration of the IED;
 wherein the delay component is configured to output the close signal to the breaker without delay upon receipt thereof until a predetermined number of close signals within a predetermined time period have been provided by the control component, after which the delay component is configured to delay further control commands.

2. The IED of claim 1, wherein the delay component comprises a hardware configuration component and wherein the delay component is configurable on-site using the hardware configuration component.

3. The IED of claim 2, wherein the hardware configuration component comprises a switch.

4. The IED of claim 2, wherein the hardware configuration component comprises a jumper terminal.

5. The IED of claim 2, wherein the delay component is configurable to a no-delay state wherein the output of the close signal is not delayed.

6. The IED of claim 2, wherein the control component issues an alarm upon detecting a change in configuration of the hardware configuration component.

7. The IED of claim 1, wherein the delay component comprises an analog timer circuit.

8. The IED of claim 1, wherein the delay component comprises a time delay on pick up (TDPU) delay.

9. The IED of claim 1, wherein the delay component comprises a counter component that allows a fixed number of reclose attempts before delaying output of the close signal.

10. The IED of claim 1, further comprising an isolation component to detect isolation of the first portion of the power delivery system from the second portion of the power delivery system.

11. The IED of claim 10, wherein the isolation component detects opening of the breaker.

12. The IED of claim 10, wherein the first portion of the power delivery system comprises a portion of a power delivery grid isolatable by opening of the breaker and one or more additional breakers and wherein the isolation component detects opening of the breaker and the one or more additional breakers.

13. The IED of claim 1, wherein the delay component is configured to delay the output of the close signal for a delay time measured from a time of isolation of the first portion of the power delivery system from the second portion of the power delivery system.

14. The IED of claim 1, wherein the control component is configured to communicate over a communication link with a remote device.

15. A control system for controlling connection of a first portion of a power delivery system to a second portion of the power delivery system, the control system comprising:
 a breaker;
 a synchronization component in communication with the power delivery system, configured to determine whether the first portion of the power delivery system is synchronized with the second portion of the power delivery system and output a synchronization signal when the first portion of the power delivery system is synchronized with the second portion of the power delivery system; and
 a microprocessor based relay comprising:
  a control component configured to selectively control opening and closing of a breaker, wherein the control component selectively outputs a close signal to the breaker to connect the first portion of the power delivery system to the second portion of the power delivery system; and
  a delay component in communication with the control component and the synchronization component, configured to delay for a delay time, output of the close signal to the breaker until both the synchronization signal is received from the synchronization component and the delay time ends, wherein the delay component comprises circuitry independent from control by the control component and wherein the delay component is only configurable by physical alteration of the control system;
 wherein the delay component is configured to output the close signal to the breaker without delay upon receipt thereof until a predetermined number of close signals within a predetermined time period have been provided by the control component, after which the delay component is configured to delay further control commands.

16. The control system of claim 15 wherein the synchronization component is internal to the control system.

17. The control system of claim 15, wherein the synchronization component is external to the control system.

18. The control system of claim 15, wherein first and second portions of the power delivery system are isolatable by the breaker and one or more additional breakers.

19. The control system of claim 15, wherein the first portion of the power delivery system comprises a rotating machine.

20. The control system of claim 19, further comprising wherein the rotating machine comprises a generator.

21. The control system of claim 15, wherein the delay component comprises a hardware configuration component and wherein the delay component is configurable on-site using the hardware configuration component.

22. The control system of claim 21, wherein the control component issues an alarm upon detecting a change in configuration of the hardware configuration component.

23. A method for preventing out-of-synchronism closing, the method comprising:
 determining whether a first portion of a power delivery system is synchronized with a second portion of the power delivery system with a synchronization component; outputting a synchronization signal when the first portion of the power delivery system is synchronized with a second portion of the power delivery system;

selectively controlling opening and closing of a breaker using a control component of an IED, wherein the control component selectively outputs a close signal to cause the breaker to connect the first portion of the power delivery system to the second portion of the power delivery system; and delaying, for a delay time, output of the close signal to the breaker using a delay component of the IED until both the synchronization signal is received from the synchronization component and the delay time ends, wherein the delay component comprises circuitry independent from control by the control component and wherein the delay component is only configurable by physical alteration of the IED;

wherein the delay component outputs the close signal to the breaker without delay upon receipt thereof until a predetermined number of close signals within a predetermined time period have been provided by the control component, after which the delay component delays further control commands.

* * * * *